US00RE37981E

(19) United States
(12) Reissued Patent
Layne

(10) Patent Number: US RE37,981 E
(45) Date of Reissued Patent: Feb. 11, 2003

(54) EMBEDDABLE MOUNTING DEVICE AND METHOD

(75) Inventor: Harry R. Layne, Covington, LA (US)

(73) Assignee: Steel Block, Inc., Covington, LA (US)

(21) Appl. No.: 09/258,129

(22) Filed: Feb. 26, 1999

Related U.S. Patent Documents

Reissue of:
(64) Patent No.: 5,649,391
Issued: Jul. 22, 1997
Appl. No.: 08/605,853
Filed: Feb. 23, 1996

(51) Int. Cl.[7] ..... E04F 19/04

(52) U.S. Cl. ..... 52/36.4; 52/27; 52/106; 52/600; 52/606; 52/364; 52/426; 52/431; 52/747.1; 52/747.12; 52/742.14; 52/749.13; 52/421; 248/231.91; 49/50; 49/55; 49/57

(58) Field of Search ..... 52/27, 36.4, 106, 52/600, 364, 561, 606, 421, 742.14, 749.13, 425, 426, 429, 431, 439, 503, 504, 79.2, 220.3, 284, 378, 379, 747.1, 747.12; 211/134, 135, 186

(56) References Cited

U.S. PATENT DOCUMENTS 460,177 A * 9/1891 Cook
480,700 A * 8/1892 Pauly
1,442,588 A * 1/1923 Tompkins
1,836,408 A * 12/1931 Sutton
2,070,641 A * 2/1937 Bartels
2,173,020 A * 9/1939 Kubach
2,205,730 A * 6/1940 Morgan
2,887,868 A * 5/1959 Glidden
3,180,059 A * 4/1965 Persak
3,213,533 A * 10/1965 Lynam et al.
3,449,878 A * 6/1969 Hern
3,546,833 A * 12/1970 Perreton
3,593,480 A * 7/1971 Bouchillon
3,722,152 A * 3/1973 Schlatter et al.
3,766,699 A * 10/1973 Dinkel
3,932,899 A * 1/1976 Brady et al.
4,043,086 A * 8/1977 Kaulfuss et al.
4,321,770 A * 3/1982 Mullins
4,467,574 A * 8/1984 Falge et al.
4,510,725 A * 4/1985 Wilson
4,677,794 A * 7/1987 Paron et al.
4,709,642 A * 12/1987 Briosii
4,720,952 A * 1/1988 Fricker
5,072,556 A * 12/1991 Egenhoefer
5,076,177 A * 12/1991 Chien
5,230,195 A * 7/1993 Sease
5,473,850 A * 12/1995 Balding
5,855,102 A * 1/1999 Chang

FOREIGN PATENT DOCUMENTS

DE 27 11 469 * 9/1978
WO WO 86/03539 * 6/1986

* cited by examiner

*Primary Examiner*—Robert Canfield
(74) *Attorney, Agent, or Firm*—Shinjyu Global IP Counselors, IP

(57) ABSTRACT

A embeddable mounting device and method for permanently affixing a fixture to a concrete block wall. The embeddable mounting device comprises a first rectangular metal plate member; a second rectangular metal plate member having dimensions equal to the first metal plate; and a pair of vertical spacer members secured between the first inner surface and the second inner surface in a manner to create at least one reinforcing bar and cement receiving cavity between the first and second metal plate members, and in a manner to hold the first and second metal plate members in parallel relationship with each other such that when said first and second metal plate members simultaneously contact a planar surface the first and second metal plate members are both perpendicularly oriented to the planar surface. A method of installing a fixture utilizing the mounting device is also described.

42 Claims, 3 Drawing Sheets

FIG. 1
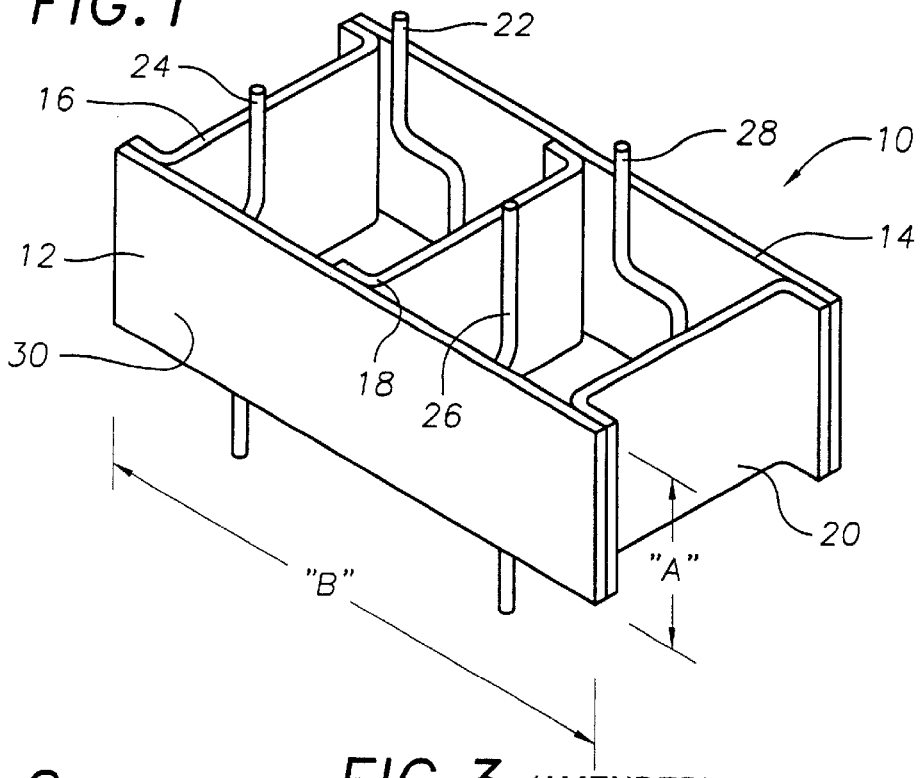
FIG. 2
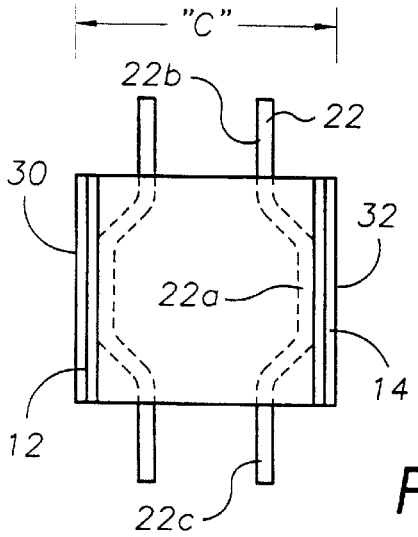
FIG. 3 - (AMENDED)
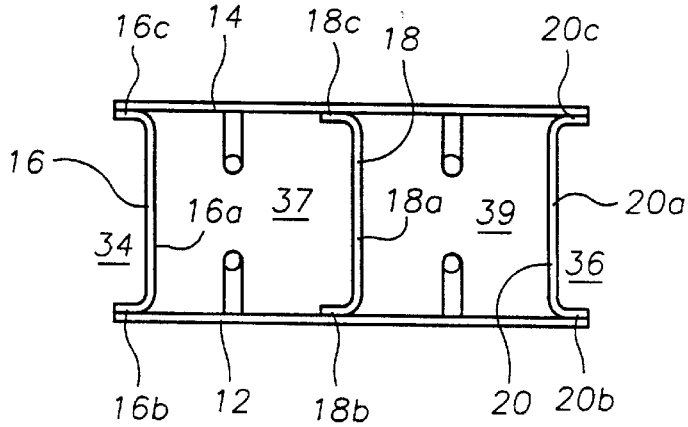
FIG. 4
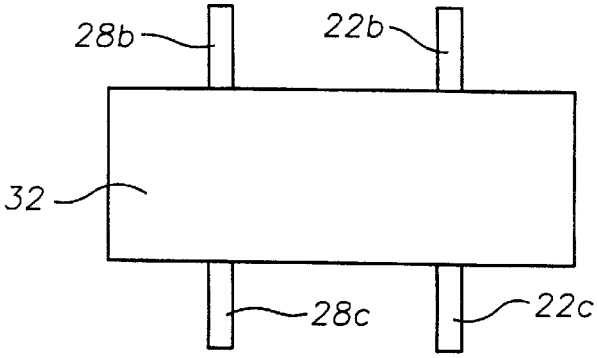

EMBEDDABLE MOUNTING DEVICE AND METHOD

Matter enclosed in heavy brackets [ ] appears in the original patent but forms no part of this reissue specification; matter printed in italics indicates the additions made by reissue.

TECHNICAL FIELD

The present invention relates to devices and methods utilized to permanently install fixtures, such as a steel wall plates, a shelves, beds, cabinets, etc., to a wall in a security facility, such as a jail, prison, juvenile detention center, or psychiatric hospital, and more particularly to an embedable wall construction unit installable within a wall in a manner to have at least one surface exposed to the surface of the wall that is suitable for forming a permanent attachment with fixtures, such as steel wall plates, beds, shelves, cabinets, etc., to anchor the fixture permanently in place, and a method of utilizing the embedable wall construction unit for permanently securing fixtures to a concrete block wall.

BACKGROUND ART

It is a common practice within the detention industry and other public facilities, such as jails, prisons, juvenile detention centers, and psychiatric hospitals, to permanently affix certain furnishing such as the beds, cabinets, shelves, lavatories, sinks etc. and fixtures such as steel wall plates to the wall of the facility. A steel wall plate is a sheet of steel that is utilized to form or cover an existing wall to provided addition security within a detainment facility. Permanently affixing these fixtures to the walls prevents destruction of the fixtures themselves and reduces the likelihood of an inmate utilizing the fixtures as a weapon to injure a guard or cell mate. The conventional method of permanently installing these fixtures has been to form a cavity within a fully constructed wall unit, install a reinforcing bar or bars into the cavity, and then grouting the reinforcing bar(s) within the cavity using a cementing agent such as cement. A steel plate is then welded or otherwise affixed to the reinforcing bars in a manner to cover the grouted cavity opening. The steel plate acts as a mounting base to which a fixture mounting bracket, such as a length of angle iron, is welded or otherwise permanently affixed.

This method of permanently affixing fixtures to concrete block walls, masonry walls and pre-cast walls is labor intensive and leads to a degraded wall structure. In addition, the gap between the concrete block wall and the steel plate may be used to hide razor blades, knives, drugs, and other contraband articles. It would be a benefit, therefore, to have a embeddable mounting device that could be used in connection with a wall that did not provide a gap between the wall and a steel mounting surface and that forms an integral part of the wall construction. It would also be desirable to have a method for mounting a fixture permanently to a concrete block wall that did not require degrading the wall structure by forming a cavity within the preexisting wall during installation of the fixture.

GENERAL SUMMARY DISCUSSION OF INVENTION

It is an object of the invention to provide a embeddable mounting device that is used in connection with a concrete block wall, a masonry wall or a pre-cast wall and that does not provide a gap between the wall and a steel mounting surface when in use.

It is a further object of the invention to provide a method of permanently mounting a fixture permanently to a wall that does not require degrading the wall structure by forming a cavity within a portion of the wall during installation of the fixture.

Accordingly, in a first aspect of the invention, a embeddable mounting device is provided. The embeddable mounting device comprises a first rectangular metal plate member having a first inner surface, a first outer surface, a first length measuring between fifteen (15") and seventeen (17") inches, a first width measuring between seven (7") and nine (9") inches, and a first thickness; a second rectangular metal plate member having a second inner surface, a second outer surface, a second length of a measurement equal to the first length, a second width of a measurement equal to the first width, and a second thickness; and a pair of vertical spacer members secured between the first inner surface and the second inner surface in a manner create at least one reinforcing bar and cement receiving cavity between the first and second metal plate members, in a manner to hold the first and second metal plate members in parallel relationship with each other such that when said first and second metal plate members simultaneously contact a planar surface the first and second metal plate members are both perpendicularly oriented to the planar surface, and in a manner such that the first and second outer surfaces are spaced apart a spacing distance measuring between seven (7") and eight (8") inches.

The first length is preferably between about eight and one-half (8½") and eight and three-quarters (8¾") inches and the first width is preferably between about sixteen and one-half (16½") and seventeen (17") inches to allow the first and second metal plate members to completely fill the space occupied by a conventional concrete block plus the area filled by the cement/grout mixture that is placed between adjacent blocks and is used to cement a plurality of the concrete blocks together to form a wall. Use of the preferably sized first and second metal plate members allows the plate members to directly contact and abut the adjacent concrete blocks located above, below, and to the sides of the mounting device in the concrete block wall within which the mounting unit is installed or embedded. Direct contact with the adjacent concrete blocks eliminates the loosening effect that can occur by the shrinking or squeezing out of the cement or grout from between the adjacent blocks and the mounting device when the mounting device is installed with a layer of cement or grout surrounding the edges of the metal plate members of the mounting device. In addition, because the concrete block is harder than the cement/grout it is more difficult to dig out around the perimeter of the exposed metal plate members to create hiding places for contraband items.

A preferred embodiment of the mounting device includes a third vertical spacer member to create a pair of reinforcing bar and cement receiving cavities that are alignable with the reinforcing bar and cement receiving cavities of conventional concrete blocks and into which vertical reinforcing bars and a cementing slurry are introduced during installation of the mounting device. The term "cementing slurry" is used herein to mean any of the cementing agents conventionally poured into the reinforcing bar and cement receiving cavities of conventional concrete blocks that are utilized to add strength to the construction. In another preferred embodiment a plurality of vertical reinforcing bars are secured to the mounting device in a manner such that, when the mounting device is placed atop a first concrete block and below a second concrete block, a length of each vertical reinforcing bar extends into at least one of the reinforcing bar and cement receiving cavities of each of the first and second cement blocks. Each of the vertical reinforcing bars is preferably connected to the mounting device by welding, however, any method of attachment that holds the vertical reinforcing bar in a fixed relationship to the mounting device may be used.

In another aspect of the invention a method of permanently mounting furniture fixtures to a concrete block wall is provided. The method includes the step of installing a mounting device, of the type described above, into the block wall in place of one of the concrete blocks during construction of the wall. The mounting device is placed into the wall in a manner such that the reinforcing bar receiving cavity of the device is aligned with at least one reinforcing bar receiving cavity of a concrete block. A vertical reinforcing bar is then inserted into the aligned reinforcing bar receiving cavities. A cementing slurry mixture is then poured into the aligned reinforcing bar receiving cavities in a manner such that the vertical reinforcing bar and a quantity of the cementing slurry mixture fills the space between the first and second plate members of the mounting device. The cementing slurry mixture is then allowed to harden. After the cementing slurry mixture has hardened sufficiently to at least hold the mounting device in place, a furnishing fixture may be permanently affixed to the wall by welding one side of a section of angle iron to the outer surface of one of the plate members and the other side of the angle iron section to the fixture. Although it is possible to utilize a mounting bracket, such as a length of angle iron or other bracket configuration, between the outer surface and the fixture, it is preferred to attach the fixture directly to the outer surface of the metal plate member through welding, or with fasteners such as bolts, security bolts, rivets, conventional interlocking connectors, etc.

When threaded connectors such as security or conventional bolts are used, one of the first and second plates preferably has at least two apertures formed therethrough that are each in connection with an internally threaded, threaded connector engaging cavity. The apertures themselves can be threaded for engagement with a threaded connector or a weld nut can be aligned with each aperture and welded to the first or second plate in a manner such that a threaded connector can engage each of the weld nuts. When this embodiment is used, it is important to provide a covering for the weld nuts prior to pouring the quantity of the cementing slurry mixture into the space between the first and second plate members of the mounting device. The covering is preferably a material that will reserve sufficient space adjacent the weld nut within the space between the first and second plates to allow the threaded connector to be fully tightened. A section of foam type plastic material placed over the nut is preferred, however, a plastic cap adapted to the seal the nut from the cement slurry is also sufficient to practice the invention.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is a perspective view of an exemplary embodiment of the embeddable mounting device of the present invention.

FIG. 2 is a side view showing one of the space members and two of the vertical reinforcing bars.

FIG. 3 is a bottom view showing the four vertical reinforcing bars, the three vertical spacer members, the two internal concrete cavities and the two side positioned concrete cavities.

FIG. 4 is a side view of the mounting device of FIG. 1 showing two of the vertical reinforcing bars extending above and below the second metal plate member.

EXEMPLARY MODE FOR CARRYING OUT THE INVENTION

Figure 5:
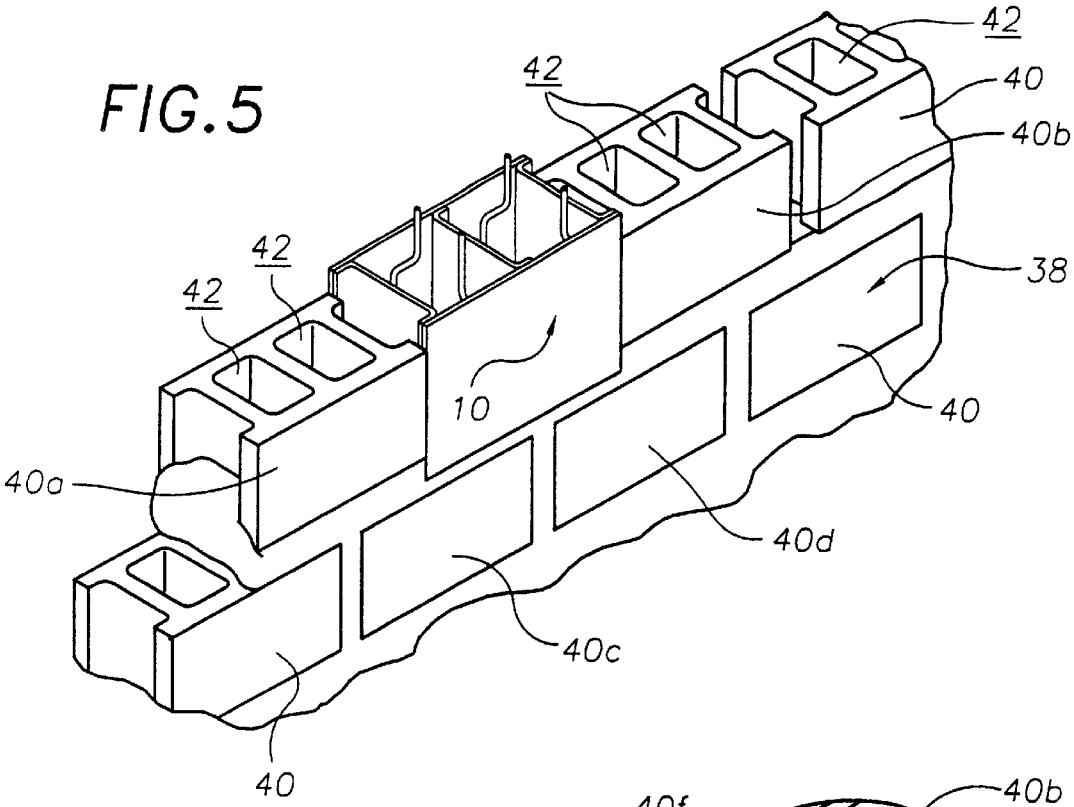
FIG. 5 is a perspective detail view of a partially constructed concrete block wall with the mounting device of FIG. 1 in place between two conventional concrete blocks.

FIG. 1 is a perspective view of an exemplary embodiment of the embeddable mounting device of the present invention generally designated by the numeral 10. Mounting device 10 includes a first rectangular metal plate member 12; a second rectangular metal plate member 14; first, second and third vertical spacer members 16,18,20; and four vertical reinforcing bars 22,24,26,28. In this embodiment first and second metal plate members 12,14 are both one-quarter (¼") inch thick mild steel plates having a height "A" of eight and five-eighths (8⅝") inches and a width "B" of sixteen and three-quarters 16¾") inches. With reference to FIG. 2, first and second plate members 12,14 are secured together and spaced a distance "C", between an outwardly facing first outer surface 30 (more clearly shown in FIG. 1) and outwardly facing second outer surface 32 (more clearly shown in FIG. 4), a distance of seven and five-eights (7⅝") inches, by the three vertical spacer members 16,18,20 (FIG. 3). Each vertical spacer member 16,18,20 is constructed from one-quarter (¼") inch thick mild steel plate having a height of eight and five-eights (8⅝") inches and a width of about nine and one-eight inches. The shorter height side edges have about a one-quarter inch radius bend located about one inch from, and running parallel to the shorter eight and five-eights inch sides. The bends are formed in a manner to form a vertical spacer member 16,18,20 having a U-shaped cross section and including, respectively, a central section 16a,18a,20a, and a pair of leg sections 16b,16c; 18b,18c; 20b,20c. The edges of leg sections 16b,16c are aligned with the edges of first and second plate members 12,14 and welded into place in a manner to form a first end cavity 34. The edges of leg sections 20b,20c are aligned with the edges of first and second plate members 12,14 and welded into place in a manner to form an oppositely directed second end cavity 36. When vertical spacer member 18 is installed, first and second reinforcing bar and cement cavities 37,39 are also formed on either side of the vertical spacer member 18.

With reference once again to FIG. 1, the four vertical reinforcing bars 22,24,26,28 are each constructed from about a fifteen and five-eighths (14⅝") inch of one-half (½") inch diameter steel reinforcing bar stock. With reference to FIG. 2, each bar 22,24,26,28 has four forty-five (45°) degree one-half (½") inch radius bends formed in a manner to create a central section 23a that is offset from the two end sections 23b,23c. With reference to FIG. 4, each end section 23b,23c extends away from mounting device 10 about three (3") inches and, in use, extends into the reinforcing bar and cement receiving cavity of a conventional concrete block FIG. 5 is a detail perspective view of a partially constructed concrete block wall, generally designated by the numeral 38. Block wall 38 is constructed from a plurality of conventional concrete blocks 40. Each concrete block 40 includes a pair of reinforcing bar and cement receiving cavities 42. A mounting device 10 is shown installed between two concrete blocks 40a,40b and above two concrete blocks 40c,40d.

Figure 6:
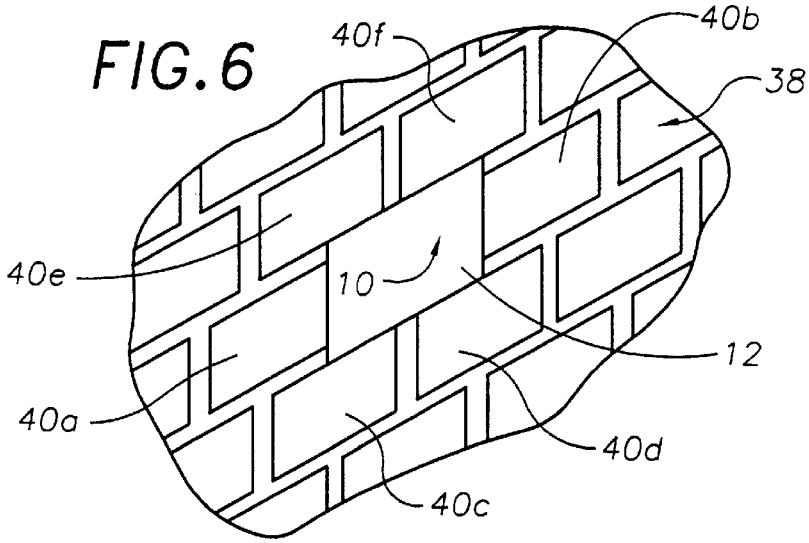
FIG. 6 is a detail perspective view of the completely constructed concrete block wall of FIG. 5 with the mounting device of FIG. 1 installed therein.
Figure 7:
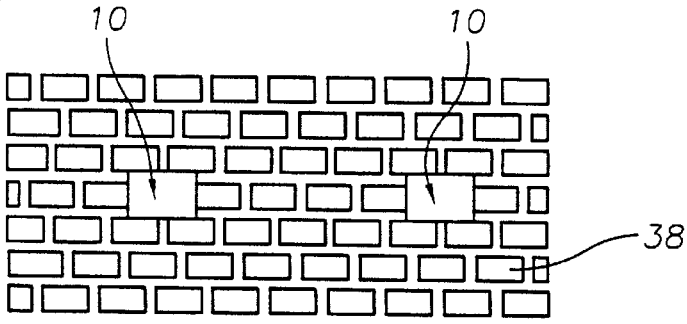
FIG. 7 is a schematic view of a concrete block wall having two mounting devices installed.

FIG. 6 is a detail perspective view of a completed wall 38 showing mounting device 10 positioned between two concrete blocks 40a,40b; above two concrete blocks 40c,40d; and below two concrete blocks 40e,40f. As shown in the figure, the perimeter edges of plate member 12 directly contact the edges of the surrounding concrete blocks 40a–40f. FIG. 7 is a schematic view showing a pair of mounting devices 10 installed within representative wall 38.

An exemplary method of installing a embeddable to a wall 38 is now described with general reference to FIGS. 1–4 and particular reference to FIGS. 5–9. With reference to FIG. 5, in the exemplary method of permanently attaching a fixture to a block wall, the method includes the step of installing at least one mounting device 10, as described above, into a block wall 38 in place of one of the concrete blocks 40 during construction. Installation of mounting device 10 is as follows: mounting device 10 is placed into wall 38 in a manner such that the reinforcing bar receiving cavities 37,38 of mounting device 10 are aligned with one reinforcing bar and cement receiving cavity 42 (not shown) each from concrete blocks 40c,40d,40e,40f. With vertical reinforcing bar end sections 23b,23c in place, a cementing slurry mixture is then poured into the aligned reinforcing bar receiving cavities 37,39, and 42 in a manner such that vertical reinforcing bars 22,24,26,28 and a quantity of the cementing slurry mixture fill the aligned reinforcing bar and cement receiving cavities 37,39, of mounting device 10 and the aligned reinforcing bar and cement receiving cavities of concrete blocks 40c,40d,40e,40f. The cementing slurry mixture is then allowed to harden while the wall 38 is fully constructed as shown in FIG. 7.

Figure 8:
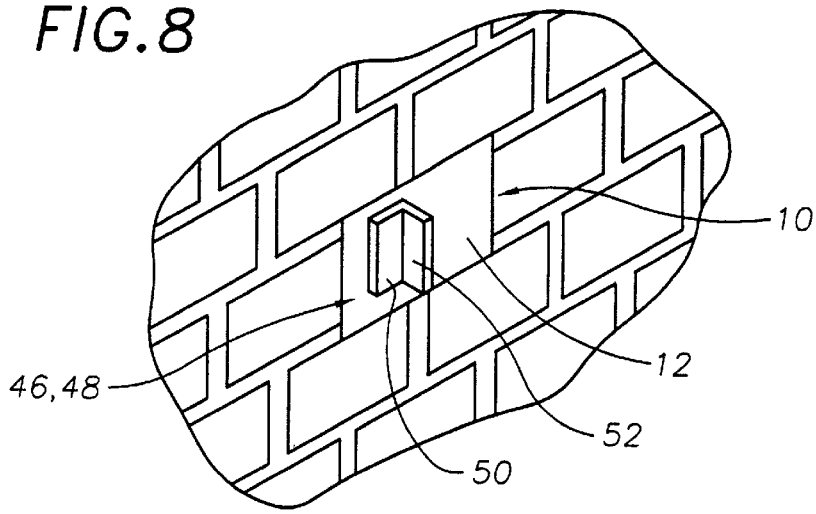
FIG. 8 is a detail perspective view of the concrete block wall of FIG. 6 with a mounting bracket welded thereto.
Figure 9:
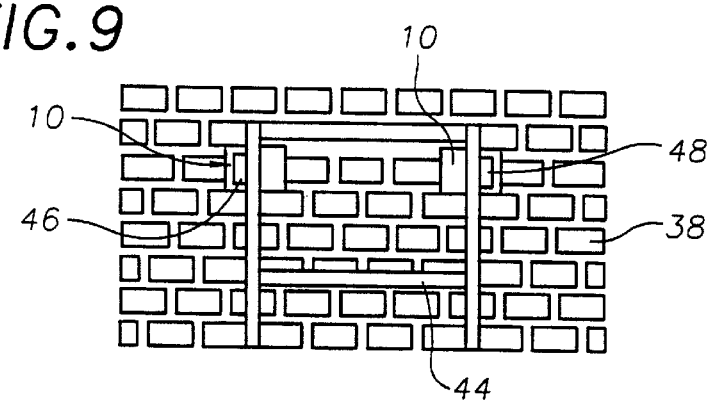
FIG. 9 is a schematic view of the concrete block wall of FIG. 7 with a bunk bed permanently affixed thereto.

Once wall 38 is fully constructed, a furnishing fixture, such as a bunk bed assembly 44 (FIG. 9) may be permanently affixed to wall 38 using two brackets 46,48. With reference to FIG. 8, in this exemplary method brackets 46,48 are lengths of angle iron having a first side 50 and a perpendicularly oriented second side 52. Fixture 44 is mounted to plate member 12 by placing fixture 44 against wall 38 in a manner such that a section of fixture 44 is adjacent one of the mounting devices 10. Each first side 50 of each bracket 46,48 is welded to a plate member 12 and each second side 52 is welded to fixture 44. Fixture 44 is now permanently attached. It can be seen that by advantageously positioning, at various heights and various spacings, one or more mounting devices 10 into a wall 38 during construction the method may be utilized to permanently install a variety of fixtures 44 to a block wall 38.

Figure 10:
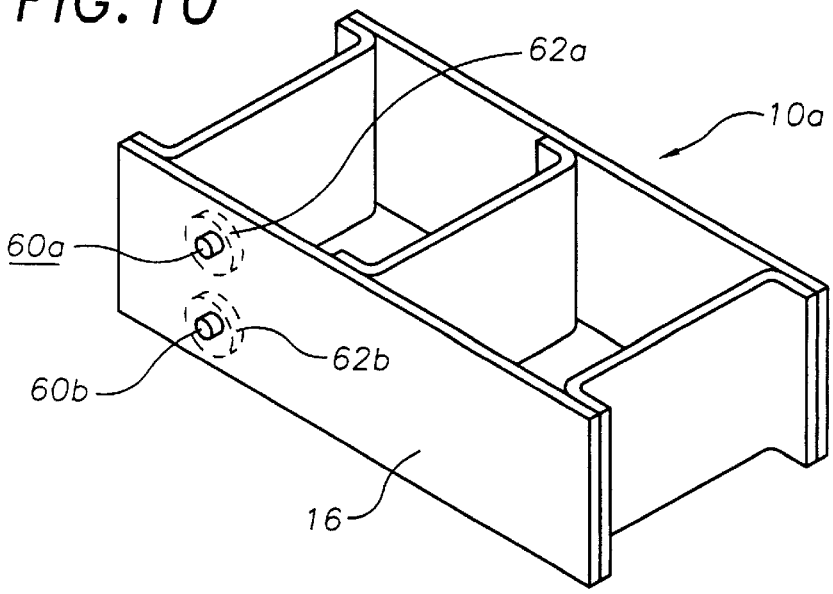
FIG. 10 is a perspective view of a secondary exemplary embodiment of the embeddable mounting device of the present invention including a pair of threaded-connector receiving apertures formed through a plate member, each threaded-connector receiving aperture having a weld nut aligned therewith and welded into place to the interior wall of the plate member.

FIG. 10 shows a second exemplary embodiment of the embeddable mounting device of the present invention, generally designated by the designation 10a. In this embodiment, the four vertical reinforcing bars 22,24,26,28 (FIG. 1) have been omitted and pair of connector receiving apertures 60a,60b have been formed through first plate member 12. A conventional weld nut 62a,62b is aligned with each threaded-connector receiving aperture 60a,60b, respectively, and welded to the interior surface of first plate member 16.

It can be seen from the preceding description that a embeddable mounting device has been provided that is used in connection with a concrete block wall and that does not provide a gap between the concrete block wall and a steel mounting surface when in place; and in a further aspect of the invention a method of permanently mounting a fixture to a concrete block wall has been provided that does not require degrading the wall structure by forming a cavity within the preexisting wall.

It is noted that the embodiment of the embeddable mounting device and method described herein in detail for exemplary purposes are of course subject to many different variations in structure, design, application and methodology. Because many varying and different embodiments may be made within the scope of the inventive concept(s) herein taught, and because many modification may be made in the embodiment herein detailed in accordance with the descriptive requirements of the law, it is to be understood that the details herein are to be interpreted as illustrative and not in a limiting sense.

What is claimed is:

1. A*n* embeddable mounting device comprising:

a first rectangular metal plate member having a first inner surface, a first outer surface, a first length measuring between fifteen (15") and seventeen (17") inches, a first width measuring between seven (7") and nine (9") inches, and a first thickness*, said first metal plate member being a one-piece unitary member*;

a second rectangular metal plate member having a second inner surface, a second outer surface, a second length of a measurement equal to said first length, a second width of a measurement equal to said first width, and a second thickness*, said second metal plate member being a one-piece, unitary member*; and

[a pair of vertical] *three* spacer members *rigidly and fixedly* secured between said first inner surface and said second inner surface in a manner to form [at least one] *a pair of* reinforcing bar and cement receiving [cavity] *cavities and a pair of end cavities* between said first and second metal plate members, [in a manner] *said spacer members having dimensions* to *non-movably* hold said first and second metal plate members in parallel relationship with each other such that when said first and second metal plate members simultaneously contact a planar surface said first and second metal plate members are both perpendicularly oriented to said planar surface, and in a manner such that said first and second outer surfaces are spaced apart a spacing distance measuring between seven (7") and eight (8") inches*, said pair or reinforcing bar and cement receiving cavities and said pair of end cavities being alignable with reinforcing bar and cement receiving cavities of conventional concrete blocks*.

2. The embeddable mounting device of claim 1, wherein: said first [length] *width* is between eight and one-half (8½") and eight and three-quarters (8¾") inches.

3. The embeddable mounting device of claim 1, wherein: said first [width] *length* is between sixteen and one-half (16½") and seventeen (17") inches.

[4. The embeddable mounting device of claim 3 wherein: said mounting device further includes a third vertical spacer member positioned between said first and second vertical spacer members to create a pair or reinforcing bar and cement receiving cavities that are alignable with said reinforcing bar and cement receiving cavities of conventional concrete blocks.]

5. [The] *An* embeddable mounting device [of claim 3 wherein] *comprising:*

*a first rectangular metal plate member having a first inner surface, a first outer surface, a first length measuring between fifteen (15") and seventeen (17") inches, a first width measuring between seven (7") and nine (9") inches, and a first thickness;*

*a second rectangular metal plate member having a second inner surface, a second outer surface, a second length of a measurement equal to said first length, a second width of a measurement equal to said first width, and a second thickness; and*

*a pair of vertical spacer members secured between said first inner surface and said second inner surface in a manner to form at least one reinforcing bar and cement receiving cavity between said first and second metal plate members, in a manner to hold said first and second metal plate members in parallel relationship with each other such that when said first and second metal plate member simultaneously contact a planar surface said first and second metal plate members simultaneously contact a planar surface said first and second metal plate members are both perpendicularly oriented to said planar surface, and in a manner such that said first and second outer surfaces are spaced apart a spacing distance measuring between seven (7") and eight (8") inches, said pair of reinforcing bar and cement receiving cavities being alignable with said reinforcing bar and cement receiving cavities of conventional concrete blocks, and* a plurality of vertical reinforcing bars [are] *being* secured to said mounting device in a manner such that, when said mounting device is placed [atop] *a top* a first concrete block having a pair of conventional reinforcing bar and cement receiving cavities and below a second concrete block having a pair of conventional reinforcing bar and cement receiving cavities, a length of each of said plurality of vertical reinforcing bars extends into at least one of said reinforcing bar and cement receiving cavities of each of said first and second cement blocks.

6. The embeddable mounting device of claim 5 wherein:

each of said plurality of vertical reinforcing bars is connected in fixed relationship to said mounting device.

7. The embeddable mounting device of claim 6 wherein:

each of said plurality of vertical reinforcing bars has four bends formed therein in a manner to create a central bar section in each of said plurality of vertical reinforcing bars that is offset from two end sections of each of said plurality of vertical reinforcing bars.

8. The embeddable mounting device of claim 1, wherein:

at least two threaded-connector receiving apertures are provided through one of said first and second plate members.

9. The embeddable mounting device of claim 1, wherein:

said first [length] *width* is between eight and one-half (8½") and eight and three-quarters (8¾") inches; and said first [width] *length* is between sixteen and one-half (16½") and seventeen (17") inches.

[10. The embeddable mounting device of claim 9 wherein:

said mounting device further includes a third vertical spacer member positioned between said first and second vertical spacer members to create a pair of reinforcing bar and cement receiving cavities that are alignable with said reinforcing bar and cement receiving cavities of conventional concrete blocks.]

11. A method of permanently affixing a furnishing fixture to a concrete block wall comprising the steps of:

a) providing at least one embeddable mounting device comprising:

a first rectangular metal plate member having a first inner surface, a first outer surface, a first length measuring between fifteen (15") and seventeen (17") inches, a first width measuring between seven (7") and nine (9") inches, and a first thickness;

a second rectangular metal plate member having a second inner surface, a second outer surface, a second length of a measurement equal to said first length, a second width of a measurement equal to said first width, and a second thickness; and a pair of vertical spacer members secured between said first inner surface and said second inner surface in a manner to form at least one reinforcing bar and cement receiving cavity between said first and second metal plate members, in a manner to hold said first and second metal plate members in parallel relationship with each other such that when said first and second metal plate members simultaneously contact a planar surface said first and second metal plate members are both perpendicularly oriented to said planar surface, and in a manner such that said first and second outer surfaces are spaced apart a spacing distance measuring between seven (7") and eight (8") inches;

b) installing said mounting device into said concrete block wall in place of a conventional concrete block, said mounting device being placed into said concrete block wall in a manner such that said reinforcing bar receiving cavity of said mounting device is aligned with at least one reinforcing bar receiving cavity of a said concrete block;

c) providing at least one vertical reinforcing bar that is insertable through one of said reinforcing bar receiving cavities of said concrete block and said reinforcing bar and cement receiving cavity of said mounting device;

d) inserting said at least one vertical reinforcing bar into one of said reinforcing bar receiving cavities of said concrete bock and said reinforcing bar and cement receiving cavity of said mounting device;

e) providing a cementing slurry;

f) pouring said cementing slurry into said reinforcing bar receiving cavities of said concrete block and said reinforcing bar and cement receiving cavity of said mounting device;

g) waiting a period of time sufficient to allow said cementing slurry to harden; and h) permanently affixing a fixture to one of said plate members of said mounting device.

12. The method of claim 11 further including the steps of:

I) providing a fixture mounting bracket; and j) permanently securing said fixture mounting bracket between one of said plate members and said fixture.

13. The method of claim 11 wherein:

said mounting device further includes a third vertical spacer member positioned between said [first and second] *pair of* vertical spacer members to create a pair of reinforcing bar and cement receiving cavities that are alignable with said reinforcing bar and cement receiving cavities of conventional concrete blocks.

14. The method of claim 11 wherein:

said mounting device further includes a plurality of vertical reinforcing bars secured to said mounting device in a manner such that, when said mounting device is placed atop a first concrete block having a pair of conventional reinforcing bar and cement receiving cavities and below a second concrete block having a pair of conventional reinforcing bar and cement receiving cavities, a length of each of said plurality of vertical reinforcing bars extends into at least one of said reinforcing bar and cement receiving cavities of each of said first and second cement blocks.

15. The method of claim 14 wherein:

each of said plurality of vertical reinforcing bars is connected in fixed relationship to said mounting device.

16. The method of claim 15 wherein:

each of said plurality of vertical reinforcing bars has four bends formed therein in a manner to create a central bar section in each of said plurality of vertical reinforcing bars that is offset from two end sections of each of said plurality of vertical reinforcing bars.

17. The method of claim 11 wherein:

said mounting device provided further includes:

a third vertical spacer member positioned between said [first and second] *a pair of* vertical spacer members to create a pair of reinforcing bar and cement receiving cavities that are alignable with said reinforcing bar and cement receiving cavities of conventional concrete blocks; and a plurality of vertical reinforcing bars secured to said mounting device in a manner such that, when said mounting device is placed [atop] *a top* a first concrete block having a pair of conventional reinforcing bar and cement receiving cavities and below a second concrete block having a pair of conventional reinforcing bar and cement receiving cavities, a length each of said plurality of vertical reinforcing bars extend into at least one of said reinforcing bar and cement receiving cavities of each of said first and second cement blocks, each of said plurality of vertical reinforcing bars being connected in fixed relationship to said mounting device, each of said plurality of vertical reinforcing bars having four bends formed therein in a manner to create a central bar section in each of said plurality of vertical reinforcing bars that offset from two end sections of each of said plurality of vertical reinforcing bars.

*18. An embeddable mounting device comprising:*

*a first rectangular metal plate member having a first inner surface, a first outer surface, a first length, a first width, and a first thickness, said first metal plate member being a one-piece, unitary member;*

*a second rectangular metal plate member having a second inner surface, a second outer surface, a second length of a measurement equal to said first length, a second width of a measurement equal to said first width, and a second thickness, said second metal plate member being a one-piece, unitary member;*

*a pair of spacer members rigidly and fixedly secured between said first inner surface and said second inner surface in a manner to form at least one reinforcing bar and cement receiving cavity and a pair of end cavities between said first and second metal plate members, in a manner to non-movably hold said first and second metal plate members in parallel relationship with each other such that when said first and second metal plate members simultaneously contact a planar surface said first and second metal plate members are both perpendicularly oriented to said planar surface, and in a manner such that said first and second outer surfaces are spaced apart a predetermined spacing distance, said at least one reinforcing bar and cement receiving cavity and said pair of end cavities being arranged to align with corresponding cement receiving cavities of conventional concrete blocks; and*

*an additional spacer member positioned between said pair of spacer members to create a pair or reinforcing bar and cement receiving cavities that are alignable with said corresponding cement receiving cavities of said conventional concrete blocks.*

*19. An embeddable mounting device comprising:*

*a first rectangular metal plate member having a first inner surface, a first outer surface, a first length, a first width, and a first thickness;*

*a second rectangular metal plate member having a second inner surface, a second outer surface, a second length of a measurement equal to said first length, a second width of a measurement equal to said first width, and a second thickness; and*

*a pair of spacer members secured between said first inner surface and said second inner surface in a manner to form at least one reinforcing bar and cement receiving cavity between said first and second metal plate members, in a manner to hold said first and second metal plate members in parallel relationship with each other such that when said first and second metal plate members simultaneously contact a planar surface said first and second metal plate members are both perpendicularly oriented to said planar surface, and in a manner such that said first and second outer surfaces are spaced apart a predetermined spacing distance;*

*a plurality of vertical reinforcing bars are secured to said mounting device in a manner such that, when said mounting device is placed a top a first concrete block having a pair of conventional reinforcing bar and cement receiving cavities and below a second concrete block having a pair of conventional reinforcing bar and cement receiving cavities, a length of each of said plurality of vertical reinforcing bars extends into at least one of said reinforcing bar and cement receiving cavities of each of said first and second concrete blocks.*

*20. The embeddable mounting device of claim 19, wherein*

*said mounting device further includes an additional spacer member positioned between said pair of spacer members to create a pair or reinforcing bar and cement receiving cavities that are alignable with said reinforcing bar and cement receiving cavities of conventional concrete blocks.*

*21. A method of permanently affixing a furnishing fixture to a concrete block wall comprising the steps of:*

*a) providing at least one embeddable mounting device comprising:*

*a first rectangular metal plate member having a first inner surface,*

*a first outer surface, a first length, a first width, and a first thickness;*

*a second rectangular metal plate member having a second inner surface, a second outer surface, a second length of a measurement equal to said first length, a second width of a measurement equal to said first width, and a second thickness; and*

*a pair of vertical spacer members secured between said first inner surface and said second inner surface in a manner to form at least one reinforcing bar and cement receiving cavity between said first and second metal plate members, in a manner to hold said first and second metal plate members in parallel relationship with each other such that when said first and second metal plate members simultaneously contact a planar surface said first and second metal plate members are both perpendicularly oriented to said planar surface, and in a manner such that said first and second outer surfaces are spaced apart a predetermined spacing distance;*

*b) installing said mounting device into said concrete block wall in place of a conventional concrete block, said mounting device being placed into said concrete block wall in a manner such that said reinforcing bar receiving cavity of said mounting device is aligned with at least one reinforcing bar receiving cavity of a said concrete block;*

*c) providing at least one vertical reinforcing bar that is insertable through one of said reinforcing bar receiving cavities of said concrete block and said reinforcing bar and cement receiving cavity of said mounting block;*

*d) inserting said at least one vertical reinforcing bar into one of said reinforcing bar receiving cavities of said concrete block and said reinforcing bar and cement receiving cavity of said mounting device;*

*e) providing a cementing slurry;*

*f) pouring said cementing slurry into said reinforcing bar receiving cavities of said concrete block and said reinforcing bar and cement receiving cavity of said mounting device;*

*g) waiting a period of time sufficient to allow said cementing slurry to harden; and*

*h) permanently affixing a fixture to one of said plate members of said mounting device.*

*22. The method of claim 21 further including the steps of:*

*i) providing a fixture mounting bracket; and*

*j) permanently securing said fixture mounting bracket between one of said plate members and said fixture.*

*23. A method of permanently affixing a furnishing fixture to a concrete block wall, comprising the steps of:*

*a) providing at least one embeddable mounting device comprising:*

*a first rectangular metal plate member having a first inner surface, a first outer surface, a first length, a first width, and a first thickness;*

*a second rectangular metal plate member having a second inner surface, a second outer surface, a second length of a measurement equal to said first length, a second width of a measurement equal to said first width, and a second thickness;*

*a pair of spacer members secured between said first inner surface and said second inner surface in a manner to form at least one reinforcing bar and cement receiving cavity between said first and second metal plate members, said pair of spacer members having dimensions to hold said first and second metal plate members in parallel relationship with each other such that when said first and second metal plate members simultaneously contact a planar surface said first and second metal plate members are both perpendicularly oriented to said planar surface, and in a manner such that said first and second outer surfaces are spaced apart a predetermined spacing distance; and*

*a third spacer member positioned between said pair of spacer members to create a pair of reinforcing bar and cement receiving cavities that are alignable with said reinforcing bar and cement receiving cavities of conventional concrete blocks;*

*b) installing said mounting device into said concrete block wall in place of a conventional concrete block, said mounting device being placed into said concrete block wall in a manner such that said reinforcing bar receiving cavity of said mounting device is aligned with at least one reinforcing bar receiving cavity of a said concrete block;*

*c) providing at least one vertical reinforcing bar that is insertable through one of said reinforcing bar receiving cavities of said concrete block and said reinforcing bar and cement receiving cavity of said mounting block;*

*d) inserting said at least one vertical reinforcing bar into one of said reinforcing bar receiving cavities of said concrete block and said reinforcing bar and cement receiving cavity of said mounting device;*

*e) providing a cementing slurry;*

*f) pouring same cementing slurry into said reinforcing bar receiving cavities of said concrete block and said reinforcing bar and cement receiving cavity of said mounting device;*

*g) waiting a period of time sufficient to allow said cementing slurry to harden; and*

*h) permanently affixing a fixture to one of said plate members of said mounting device.*

*24. The method of claim 22, wherein*

*said mounting device further includes a plurality of vertical reinforcing bars secured to said mounting device in a manner such that, when said mounting device is placed atop a first concrete block having a pair of conventional reinforcing bar and cement receiving cavities and below a second concrete block having a pair of conventional reinforcing bar and cement receiving cavities, a length of each of said plurality of vertical reinforcing bars extends into at least one of said reinforcing bar and cement receiving cavities of each of said first and second cement blocks.*

*25. A method of forming a mounting device for a concrete block wall, comprising the steps of:*

*providing at least one embeddable mounting device comprising:*

*a first rectangular metal plate member having a first inner surface, a first outer surface, a first length, a first width, and a first thickness;*

*a second rectangular metal plate member having a second inner surface, a second outer surface, a second length of a measurement equal to said first length, a second width of a measurement equal to said first width, and a second thickness; and*

*a pair of vertical spacer members secured between said first inner surface and said second inner surface in a manner to form at least one reinforcing bar and cement receiving cavity between said first and second metal plate members, in a manner to hold said first and second metal plate members in parallel*

*relationship with each other such that when said first and second metal plate members simultaneously contact a planar surface said first and second metal plate members are both perpendicularly oriented to said planar surface, and in a manner such that said first and second outer surfaces are spaced apart a predetermined spacing distance;*

*installing said mounting device into said concrete block wall in place of a conventional concrete block, said mounting device being placed into said concrete block wall in a manner such that said reinforcing bar receiving cavity of said mounting device is aligned with at least one reinforcing bar receiving cavity of said concrete block;*

*providing a cementing slurry; and*

*pouring said cementing slurry into said reinforcing bar receiving cavities of said concrete block and said reinforcing bar and cement receiving cavity of said mounting device.*

*26. An embeddable mounting device comprising:*

*a first rectangular metal plate member having a first inner surface, a first outer surface, a first length, a first width, and a first thickness;*

*a second rectangular metal plate member having a second inner surface, a second outer surface, a second length of a measurement equal to said first length, a second width of a measurement equal to said first width, and a second thickness; and*

*three rigid spacer members extending between said first inner surface and said second inner surface to form at least two cement cavities, said spacer members having dimensions to non-movably hold said first and second metal plate members in parallel relationship with each other such that when said first and second metal plate members simultaneously contact a planar surface said first and second metal plate members are both perpendicularly oriented to said planar surface, and in a manner such that said first and second outer surfaces are spaced apart a predetermined spacing distance, said cement cavities being arranged to align with corresponding cement receiving cavities of conventional concrete blocks.*

*27. The embeddable mounting device of claim 26, wherein said three spacer members are further dispose between said first inner surface and said second inner surface to form a pair of end cavities between said first and second metal plate members.*

*28. The embeddable mounting device of claim 26, wherein said three spacer members are plate members that extend between said first and second inner surfaces of said first and second metal plate members, respectively.*

*29. The embeddable mounting device of claim 28, wherein each of said plate members forming said three spacer members has an U-shaped cross section with a central section extending perpendicularly between said first and second metal plate members, respectively, and a pair of leg sections secured to said first and second metal plate members, respectively.*

*30. The embeddable mounting device of claim 29, wherein said central sections of said plate members forming said three spacer members are free of openings.*

*31. The embeddable mounting device of claim 26, wherein said three spacer members are shorter than said first and second widths of said first and second metal plate members.*

*32. The embeddable mounting device of claim 26, wherein said three spacer members are identical, except for orientation.*

*33. The embeddable mounting device of claim 26, wherein each of said three spacer members is a one-piece, unitary member with said three metal spacer members being arranged parallel to each other.*

*34. The embeddable mounting device of claim 26, wherein said first and second rectangular metal plate members have peripheral edges with each of said three spacer members being spaced inwardly from said peripheral edges.*

*35. An embeddable mounting device comprising:*

*a first rectangular metal plate member having a first inner surface, a first outer surface, a first length, a first width, and a first thickness;*

*a second rectangular metal plate member having a second inner surface, a second outer surface, a second length of a measurement equal to said first length, a second width of a measurement equal to said first width, and a second thickness; and*

*a pair of rigid spacer members extending between said first inner surface and said second inner surface in a manner to form at least one cement cavity between said first and second metal plate members, said spacer members having dimensions to hold said first and second metal plate members in parallel relationship with each other such that when said first and second metal plate members simultaneously contact a planar surface said first and second metal plate members are both perpendicularly oriented to said planar surface, and in a manner such that said first and second outer surfaces are spaced apart a predetermined spacing distance;*

*a reinforcing bar having a portion extending into said at least one of said cement cavities of said mounting device, such that when said mounting device is placed a top a first concrete block having a pair of conventional cement cavities and below a second concrete block having a pair of conventional cement cavities said reinforcing bar extends into at least one of said cement cavities of each of said first and second concrete blocks.*

*36. The embeddable mounting device of claim 35, wherein said spacer members are further dispose between said first inner surface and said second inner surface to form a pair of end cavities between said first and second metal plate members.*

*37. The embeddable mounting device of claim 35, wherein said spacer members are plate members that extend between said first and second inner surfaces of said first and second metal plate members, respectively.*

*38. The embeddable mounting device of claim 37, wherein each of said plate members forming said spacer members has an U-shaped cross section with a central section extending perpendicularly between said first and second metal plate members, respectively, and a pair of leg sections secured to said first and second metal plate members, respectively.*

*39. The embeddable mounting device of claim 38, wherein said central sections of said plate members forming said spacer members are free of openings.*

*40. The embeddable mounting device of claim 35, wherein said spacer members are shorter than said first and second widths of said first and second metal plate members.*

*41. The embeddable mounting device of claim 35, wherein said spacer members are identical, except for orientation.*

*42. The embeddable mounting device of claim 35, wherein each of said spacer members is a one-piece, unitary member with said spacer members being arranged parallel to each other.*

*43. The embeddable mounting device of claim 35, wherein said first and second rectangular metal plate members have peripheral edges with each of said spacer members being spaced inwardly from said peripheral edges.*

*44. A method of forming a mounting device for a concrete block wall, comprising the steps of:*

*providing at least one embeddable mounting device comprising:*

*a first rectangular metal plate member having a first inner surface, a first outer surface, a first length, a first width, and a first thickness;*

*a second rectangular metal plate member having a second inner surface, a second outer surface, a second length of a measurement equal to said first length, a second width of a measurement equal to said first width, and a second thickness; and*

*a pair of rigid spacer members extending between said first inner surface and said second inner surface in a manner to form at least one cement cavity between said first and second metal plate members, said spacer members having dimensions to hold said first and second metal plate members in parallel relationship with each other such that when said first and second metal plate members simultaneously contact a planar surface said first and second metal plate members are both perpendicularly oriented to said planar surface, and in a manner such that said first and second outer surfaces are spaced apart a predetermined spacing distance, said first and second rectangular metal plate members having peripheral edges with each of said spacer members being spaced inwardly from said peripheral edges;*

*installing said mounting device into said concrete block wall in place of a conventional concrete block; said mounting device being placed into said concrete block wall in a manner such that said cement cavity of said mounting device is aligned with at least one cement cavity of said concrete block;*

*providing a cementing slurry; and*

*pouring said cementing slurry into said cement cavities of said concrete block and said cement cavity of said mounting device.*

* * * * *